UNITED STATES PATENT OFFICE.

BENDIX THEMANS, OF ENSCHEDE, NETHERLANDS.

PROCESS OF TREATING WORN-OUT HEDDLES.

SPECIFICATION forming part of Letters Patent No. 659,715, dated October 16, 1900.

Application filed April 26, 1898. Serial No. 678,891. (No specimens.)

*To all whom it may concern:*

Be it known that I, BENDIX THEMANS, a subject of the Queen of the Netherlands, residing at Enschede, Netherlands, have invented an Improved Process of Treating Worn-Out Heddles, of which the following is a specification.

This invention relates to means for utilizing worn-out heddles and converting them into wiping and cleaning material, stock for strings, webbing, paper, &c. In this way an article which has heretofore been entirely useless and has been thrown away is rendered available for a number of useful applications.

In carrying my invention into effect one hundred parts, by weight, of the worn-out heddles are treated with about ten parts of a suitable caustic alkali, such as caustic soda, for from two to three hours, this caustic alkali being in the form of a solution having a strength of 4° Baumé. The mixture is washed in water to separate the stringy mass, which is dried in a centrifugal swinging machine and bleached by a solution of chlorid of lime of 2° Baumé for four to six hours and a sufficient quantity to cover the heddles. The washing and drying by swinging is repeated and the material treated with a solution of muriatic or sulfuric acid of 2° Baumé for from four to six hours for the purpose of removing any remaining lime. The washing and drying is again repeated, the material is then cooked in a lye of caustic soda of $1\frac{1}{2}$° Baumé for from four to six hours, and the product is finally washed and dried.

The treatment of the heddles with caustic soda serves to remove the starch and the varnish-like mass from the heddles. The caustic soda dissolves the varnish-like mass and the fecula, while at the same time the working ingredients of the starch are secreted.

What I claim is—

The process of converting worn-out heddles into pulp-stock which consists in treating them with a caustic alkali, washing them to separate the strings, drying and bleaching the strings, again washing and drying them, treating them with an acid, again washing and drying them, cooking them in a caustic lye, and again washing and drying them, substantially as specified.

BENDIX THEMANS.

Witnesses:
    HANS FRIEDRICH,
    WILLIAM ESSENWEIN.